(12) United States Patent
Junge et al.

(10) Patent No.: US 9,535,271 B2
(45) Date of Patent: Jan. 3, 2017

(54) DEVICE FOR REGULATING THE PASSAGE OF ENERGY

(71) Applicant: MERCK PATENT GMBH, Darmstadt (DE)

(72) Inventors: Michael Junge, Pfungstadt (DE); Andreas Beyer, Hanau (DE)

(73) Assignee: MERCK PATENT GMBH, Darmstadt (DE)

( * ) Notice: Subject to any disclaimer, the term of this patent is extended or adjusted under 35 U.S.C. 154(b) by 26 days.

(21) Appl. No.: 14/368,829

(22) PCT Filed: Nov. 29, 2012

(86) PCT No.: PCT/EP2012/004922
§ 371 (c)(1),
(2) Date: Jun. 26, 2014

(87) PCT Pub. No.: WO2013/097919
PCT Pub. Date: Jul. 4, 2013

(65) Prior Publication Data
US 2014/0333985 A1 Nov. 13, 2014

(30) Foreign Application Priority Data
Dec. 27, 2011 (EP) .................... 11010216

(51) Int. Cl.
*G02F 1/01* (2006.01)
*G02F 1/13* (2006.01)
*G02F 1/1335* (2006.01)

(52) U.S. Cl.
CPC .......... *G02F 1/0147* (2013.01); *G02F 1/0136* (2013.01); *G02F 1/132* (2013.01); *G02F 1/133528* (2013.01); *C09K 2219/13* (2013.01)

(58) Field of Classification Search
CPC ...................................... G02F 1/0147
(Continued)

(56) References Cited

U.S. PATENT DOCUMENTS 8,169,685 B2  5/2012  Powers
8,760,750 B2  6/2014  Powers
(Continued)

FOREIGN PATENT DOCUMENTS

JP  2004-012929 A  1/2004
JP  2006-267812 A  10/2006
(Continued)

OTHER PUBLICATIONS

International Search Report dated Feb. 7, 2013 issued in corresponding PCT/EP2012/004922 application (pp. 1-2).
(Continued)

*Primary Examiner* — James Jones
(74) *Attorney, Agent, or Firm* — Millen White Zelano and Branigan, PC; John Sopp; Anthony Zelano

(57) ABSTRACT

The present invention relates to a device for regulating the passage of energy through a light-transmitting area, comprising a first polarization layer, a second polarization layer and a switching layer which is arranged between the two polarization layers and changes the polarization properties of polarized light as a function of temperature, where the two polarization layers are characterized by a suitable choice of their transmission in the transmission direction and their degree of polarization. The invention furthermore relates to a process for the production of the device according to the invention and to the use of the device for influencing light transmission and/or the passage of energy into an interior as a function of temperature.

13 Claims, 4 Drawing Sheets

(58) Field of Classification Search
USPC .......................................................... 359/288
See application file for complete search history.

(56) References Cited

U.S. PATENT DOCUMENTS

2009/0167971 A1* 7/2009 Powers ..................... E06B 9/24
349/18
2013/0083284 A1 4/2013 Junge

FOREIGN PATENT DOCUMENTS

JP    2011-522277 A    7/2011
WO    2011/154077 A1   12/2011

OTHER PUBLICATIONS

Office Action in corresponding TW application 101150213 mailed on Jul. 18, 2016.
Office Action in corresponding JP application 2014549376 mailed on Jul. 27, 2016.
Office Action in corresponding CN application 20120064583.3 mailed on Aug. 12, 2016.
machine translation of JP2006267812A published on Oct. 5, 2006 to Kuraray Co.
machine translation of JP2004012929A published on Jan. 15, 2004 to Nitto Denko Corp.

* cited by examiner

DEVICE FOR REGULATING THE PASSAGE OF ENERGY

The present invention relates to a device for regulating the passage of energy through a light-transmitting area, comprising a first polarisation layer, a second polarisation layer and a switching layer which is arranged between the two polarisation layers and changes the polarisation properties of polarised light as a function of temperature, where the two polarisation layers are characterised by a suitable choice of their transmission in the transmission direction and their degree of polarisation. The invention furthermore relates to a process for the production of the device according to the invention and to the use of the device for influencing light transmission and/or the passage of energy into an interior as a function of temperature.

The energy efficiency of buildings is increasing in importance with rising energy costs. Windows and glass facades are critical parts of a building through which the majority of a building's heat energy is lost at low outside temperatures or through which the majority of the energy entry into a building takes place in the case of intense insolation.

There is therefore a demand for devices which control light transmission and thus the flow of energy through windows or glass areas. In particular, there is a demand for devices which are able to match the energy flow through glass areas to the conditions (heat, cold, high insolation, low insolation) prevailing at the particular point in time.

For the purposes of the present invention, the term light is taken to mean electromagnetic radiation in the UV-A, VIS and NIR region. In particular, it is taken to mean radiation which is not absorbed or is only absorbed to a negligible extent by the materials usually used in windows (for example glass). According to the definitions usually used in the area of radiation physics, UV-A light is taken to mean radiation having a wavelength of 320 to 380 nm, VIS light is taken to mean radiation having a wavelength of 380 nm to 780 nm and NIR light is taken to mean radiation having a wavelength of 780 nm to 3000 nm. For the purposes of the present invention, the term light is therefore taken to mean radiation having a wavelength of 320 to 3000 nm.

In the cold season, it is desired that a maximum of light and thus transported energy enters a building through glass areas. This enables heating and lighting costs to be saved.

In the warm season, on the other hand, it is desired that the lowest possible energy entry into a building through glass areas occurs. This enables a more pleasant room climate to be achieved or air-conditioning costs to be saved. Furthermore, a reduction in the incident light intensity may be desired in these cases, for example in order to reduce dazzle due to direct insolation.

There is therefore a demand for switching elements which regulate the entry of energy in the form of light into interiors, for example through windows or other glass areas. In particular, there is a demand for switching elements which automatically match the regulation of light transmission to the prevailing conditions, as described above (smart windows). Furthermore, there is a demand for switching elements which operate energy-efficiently, can be installed with the lowest possible technical complexity, are technically reliable and meet aesthetic demands. Further aspects are easy processability of the switching element, robustness in operation and the possibility of retrofitting to existing glass areas of buildings.

US 2009/0015902 and US 2009/0167971 disclose temperature-reactive devices which contain a liquid-crystalline medium in a layer between two highly efficient polarisers. Switching between a state having relatively high light transmission and a state having relatively low light transmission is achieved here by a phase transition of the liquid-crystalline medium from a nematic state to an isotropic state without the application of a voltage becoming necessary.

However, devices of this type have the disadvantage that they have a light transmission in the state having relatively high light transmission of theoretically a maximum of 50%, in practice at most 30 to 40%. Furthermore, the transmission in the state having relatively low light transmission is virtually equal to zero, i.e. the device darkens completely.

For use of the devices in practice, for example in buildings or in vehicles, however, it would be desirable for them to have a transmission in the state having relatively high light transmission (=open state) of 50 to 70%. Otherwise, an impression of significant darkening of the window would arise in the open state of the device.

Furthermore, it is desirable for practice for the device not to be completely dark in the state having relatively low transmission (=closed state), but instead to have residual transmission. A minimum transmission of 7% is regarded as subjectively still pleasant in the case of windows.

US 2011/0102878 discloses that relatively thin polarisers having increased transmissivity can be used instead of highly efficient polarisers in the devices in accordance with US 2009/0015902 and US 2009/0167971. According to the disclosure of the said application, this has the effect that the transmission in the open state of the device is increased. However, the switching range of the device, i.e. the difference in the light transmission between the open state and the closed state, becomes smaller due to an embodiment of this type.

In the case of devices for regulating the passage of energy, it is desirable to be able to pre-determine both the transmission in the bright state and also the switching range of the device as necessary. For example, it may be advantageous for certain applications for the device to have a very large switching range. For other applications, it may be advantageous to combine a relatively large switching range with relatively high light transmission.

It has been found in accordance with the invention that this can be achieved through a suitable choice of the parameters P (degree of polarisation) and T1 (transmission in the transmission direction) of the polarisers.

The invention thus relates to a device for regulating the passage of energy through a light-transmitting area, where the device comprises the following layers:
 a first polarisation layer,
 a second polarisation layer, and
 a switching layer, arranged between the two polarisation layers, which changes the polarisation properties of polarised light as a function of temperature,
where the two polarisation layers have, identically or differently, a degree of polarisation P in the range 20-85% and a transmission in the transmission direction T1 in the range 70-100%, determined at a wavelength of 550 nm.

The use of polarisation layers which have both the said degrees of polarisation P and also the said transmissions in the transmission direction T1 gives devices which have a satisfactory dark transmission of at least 7.5%. A satisfactory bright transmission of at least 30%, preferably at least 40%, is furthermore present. A switching range of at least 5%, preferably at least 7.5%, is furthermore present.

Furthermore, a suitable choice of the two parameters P and T1 from the said ranges enables the production of devices in which the values for the bright transmission and the switching range can be set independently of one another.

The parameters P and T1 are, as is generally known to the person skilled in the art in the area of devices comprising polarisation layers, defined as follows:

P is obtainable through the equation $$P=(T1-T2)/(T1+T2)$$

from the values for T1 and T2. T1 represents the transmission of the polariser in the transmission direction at a wavelength of 550 nm. The transmission direction is taken to mean the orientation of incident polarised light in which the highest transmission through the polariser occurs. T2 represents the transmission of the polariser in the blocking direction at a wavelength of 550 nm. The blocking direction is taken to mean the orientation of incident polarised light in which the lowest transmission through the polariser occurs.

The bright transmission of the device, as indicated above, is taken to mean the transmission through the device which occurs in the switching state having relatively high light transmission. Correspondingly, the dark transmission of the device is taken to mean the transmission through the device which occurs in the switching state having relatively low light transmission. The transmissions are again defined for a light wavelength of 550 nm.

Finally, the switching range of the device is taken to mean the difference between the values for the bright transmission and the dark transmission.

It is noted that the optical values T1, T2, P and the bright transmission, the dark transmission and the switching range have basically been determined for a wavelength of 550 nm in the present application, unless explicitly indicated otherwise.

For the purposes of the present invention, the term energy is taken to mean energy of electromagnetic radiation (light energy) in the UV-A, VIS and NIR region. In particular, it is taken to mean light energy which is not absorbed by the materials usually used in windows (for example glass) or is only absorbed to a negligible extent.

In accordance with the invention, the two switching states of the device are a switching state having relatively high light transmission through the device (bright state) and a switching state having relatively low light transmission through the device (dark state).

Owing to the generally known laws of physics, high light transmission through the device results in high energy entry into the interior which the device has applied to a light-transmitting area. Low light transmission through the device correspondingly results in low energy entry into the interior. The device therefore regulates the entry of energy into the interior by the switching of its light transmission.

The device switches from a switching state having relatively high light transmission to a switching state having relatively low light transmission as a function of temperature. The switching states of the device are consequently associated with different temperature ranges of the device. The switching of the device preferably takes place gradually in a temperature range between 0° C. and 80° C., preferably between 10° C. and 70° C. and very particularly preferably between 20° C. and 60° C.

According to a preferred embodiment of the invention, the switching state having relatively high light transmission is present at relatively low temperatures of the device, and the switching state having relatively low light transmission is present at relatively high temperatures of the device. Correspondingly, the bright state of the device preferably occurs at temperatures below 0° C., particularly preferably below 10° C. and very particularly preferably below 20° C. The dark state of the device preferably occurs at temperatures above 80° C., particularly preferably above 70° C. and very particularly preferably above 60° C.

The functioning of the device is based on the fact that incident light is polarised by the first polarisation layer. This means that predominantly light having certain polarisation properties is allowed through. The switching layer is arranged behind the first polarisation layer. In a first state, this does not influence the polarisation properties of the light passing through it. The light subsequently hits the second polarisation layer, which is arranged behind the switching layer. Corresponding to the arrangement of the transmission directions of the polarisation layers with respect to one another, a certain proportion of the light can now also pass through the second polarisation layer. In the other of the two switching states, the polarisation-influencing switching layer changes the polarisation properties of the light passing through it. A greater or smaller proportion of the polarised light can consequently now pass through the second polariser, depending on the way in which the polarisation properties of the light have been changed by the switching layer. In any case, the change in the polarisation properties of the light by the switching layer in its second state gives rise to a change in the light transmission of the device compared with the first state of the switching layer, in which it does not influence the polarisation properties of the light.

According to a preferred embodiment of the invention, the two polarisation layers are linear polarisers whose preferential directions of the polarisation are rotated by an angle of 60-120°, preferably 75-105° and particularly preferably 80 to 100° with respect to one another. In one of the two states, the switching layer does not rotate the plane of polarisation of the light or only does so slightly. In the other of the two states, it rotates the plane of polarisation of the light by an angle which corresponds to the angle in which the preferential directions of the polarisation of the polarisers are rotated with respect to one another, or deviates from this angle only slightly, for example by 1-10°. In this configuration, the light passing through the first polariser also passes through the second polariser if the switching layer is in the state in which it rotates the plane of polarisation of the light. The active state of the switching layer thus corresponds to the bright state of the device. By contrast, if the switching layer is in its inactive state, i.e. the state in which it does not rotate the plane of polarisation of the light, the light hitting the second polariser cannot pass through it, since the preferential directions of the polarisation of the two polarisers are rotated with respect to one another. The inactive state of the switching layer therefore corresponds to the dark state of the device in this embodiment.

The active state of the switching layer is associated with an optically anisotropic state, preferably a liquid-crystalline state, of the switching layer, and the inactive state of the switching layer is associated with a substantially isotropic state of the switching layer.

The switching layer in the optically anisotropic state preferably rotates the plane of polarisation of linear-polarised light by an angle of 10° or more, whereas in the isotropic state it does not rotate the plane of polarisation of linear-polarised light or only does so to a negligible extent. It particularly preferably rotates the plane of polarisation of linear-polarised light by an angle of greater than 40°, very particularly preferably by an angle of greater than 70°. Greatest preference is given to angles of rotation of 70 to 110°, even greater angles of 80 to 100°. However, angles of rotation which are greater than the preferred angles of rotation indicated by a multiple of 180° are also possible.

In accordance with the invention, the switching operation between the two switching states does not occur abruptly at a certain temperature, but instead gradually in a transition region which is in a temperature range. This temperature range of the transition region preferably has a width of 5 to 100 degrees Celsius, i.e. occurs, for example, between 15 and 110° C. The temperature range particularly preferably has a width of 10 to 50 degrees Celsius. Within the temperature range of the transition region, the transmission of the device changes gradually via intermediate values of the transmission from the value for the bright transmission to the value for the dark transmission of the device.

The device preferably switches exclusively under temperature control. It therefore preferably contains no devices for electrical triggering of the switching operation. It particularly preferably contains no wires, cables, electrical connections or circuits. Furthermore, it is preferably not triggered electrically from the outside or supplied with current, i.e. represents a system which is autonomous per se.

The passage of energy preferably takes place through a light-transmitting area into an interior. The interior is preferably the interior of a building, for example a residential building, an office building, or a building used for commercial purposes. Alternatively, the interior can also be the interior of a vehicle, for example an automobile, or the interior of a transport container, for example a shipping container. The device can be used in accordance with the invention for any desired interiors so long as these have only limited exchange of air with the environment and have light-transmitting limiting surfaces through which the entry of energy from the outside in the form of light energy can take place. The invention is particularly relevant to interiors which are subjected to strong insolation through light-transmitting areas, for example through window areas.

Preference is given to light-transmitting areas such as windows or ceilings having a size of greater than 0.5 m$^2$, particularly preferably greater than 1 m$^2$, very particularly preferably greater than 3 m$^2$. This is due to the fact that high energy uptake into the interior can take place through such areas if they are irradiated by the sun. Preference is furthermore given to light-transmitting areas which are subjected to high insolation owing to their spatial alignment and/or the geographical and climatic location of the building.

The device is preferably arranged over the entire area of the light-transmitting area, so that the light transmission through the area can be regulated as fully as possible. In a possible embodiment, the coverage takes place by means of a single device. In an alternative embodiment, however, the coverage can also take place by a plurality of devices, which are either directly adjacent to one another or are arranged in such a way that interspaces remain.

In a preferred embodiment, the light-transmitting area is a glass pane or a Plexiglas pane. In the case of window panes, multipane insulating glass is preferred. According to a preferred embodiment, the device according to the invention is applied directly to this pane.

An application of this type can be carried out by retrofitting an existing arrangement or by complete re-installation.

According to a preferred embodiment, the device is mounted in the interior of multipane insulating glass or mounted outside on a glass of this type. Preference is generally given to use on a pane side facing the interior or in the interspace between two glass panes in the case of multipane insulating glass. However, other arrangements are also conceivable and preferable in certain cases. The person skilled in the art will be able to weigh up advantages and disadvantages of certain arrangements against one another with respect to the durability of the device, optical and aesthetic points of view, practical points of view with respect to cleaning of the panes, and with respect to the reactivity of the device to temperature changes and select an optimum design for the case in question.

According to a preferred embodiment, the device is characterised in that it has an area extension of at least 0.05 m$^2$, preferably 0.1 m$^2$ to 20 m$^2$ and particularly preferably 0.2 m$^2$ to 5 m$^2$.

It is preferred in accordance with the invention for the polarisation layers of the device to have, identically or differently, a degree of polarisation P in the range 30-85% and a transmission in the transmission direction T1 in the range from 75 to 100%, where the values are determined at a wavelength of 550 nm. A degree of polarisation P in the range from 35 to 80% and a transmission T1 in the range from 75 to 100% are particularly preferred for the polarisation layers.

Within the ranges according to the invention for P and T1, certain combinations of value ranges for P and T1 have been found for which certain properties of the characteristic device parameters bright transmission and switching range occur. The dark transmission here remains above the minimum value of 7%.

A device having the largest possible switching range is obtained if P for the polarisers is selected, identically or differently, from the range 45-85% and T1 is selected from the range 75-100%. Preferably, P is selected from the range 55-85% and T1 from the range 80-100%. Very particularly preferably, P is selected from the range 65-85% and T1 from the range 85-100%.

The minimum values given above for the bright transmission and the dark transmission are observed here.

A device having a moderate switching range combined with moderate bright transmission is obtained if P for the polarisers is selected, identically or differently, from the range from 30 to 85% and T1 is selected from the range from 80 to 100%. Preferably, P is selected from the range from 40 to 75% and T1 from the range from 90 to 100%. The minimum values given above for the dark transmission are observed here.

A device having the highest possible bright transmission is obtained if P for the polarisers is selected, identically or differently, from the range from 25 to 60% and T1 is selected from the range from 90 to 100%. Preferably, P is selected from the range from 30 to 40% and T1 from the range from 95 to 100%. The minimum values given above for the dark transmission and the switching range are observed here.

The values for P and T1 for the polarisation layers can be set independently of one another. Methods for this purpose are known to the person skilled in the art. These include, for example, changing the layer thickness of the polarisation layer, changing the degree of alignment of the polarisation layer and changing the concentration of the light-absorbing species in the polarisation layer.

In the case of iodine-polyvinyl alcohol polarisers, the parameters P and T1 can be varied independently of one another, for example by changing the degree of stretching of the polymer or by changing the amount of incorporated iodine.

In the case of polarisers comprising a liquid-crystalline medium and a dichroic dye, the parameters P and T1 can be varied independently of one another, for example by changing the liquid-crystalline medium and changing the concentration of the dichroic dye. Explicit working examples in this respect are given in a following section.

In many cases, it will be necessary to produce a relatively large number of different polarisers with variation of the production parameters indicated above and to measure their values P and T1. An empirical correlation between production parameters (for example degree of stretching and concentration of dye) and value pairs T1 and P can be recognised therefrom and can form the basis for the person skilled in the art specifically to be able to produce polarisers having any desired values T1 and P.

The invention thus furthermore relates to a process for the production of a device for regulating the passage of energy through a light-transmitting area, where the device comprises the following layers:
- a first polarisation layer,
- a second polarisation layer,
- a switching layer, arranged between the two polarisation layers, which changes the polarisation properties of polarised light as a function of temperature, characterised in that the two parameters degree of polarisation P and transmission in the transmission direction T1 for the polarisation layers are selected, independently of one another, by variation of one or more production parameters selected from layer thickness, degree of alignment of the polarisation layer, concentration of incorporated substance, degree of alignment of the incorporated substance, absorption properties of the incorporated substance, structure of the incorporated substance, dichroism of the incorporated substance and aggregation properties of the incorporated substance.

The structure of the incorporated substance is taken to mean its molecular structure, in particular its length-to-width ratio. The greater the length-to-width ratio of a substance, the greater generally is the degree of alignment.

The aggregation properties of the incorporated substance are taken to mean, in particular, the ability to form chains of individual molecules or individual atoms of the substance.

In the process, the degree of polarisation P is preferably selected from the range 20-85% and the transmission in the transmission direction is preferably selected from the range 70-100%. Particularly preferably, P is selected from the range 30-85% and T1 is selected from the range from 75 to 100%.

The preferred embodiments of the polarisation layers and the switching layer which are indicated for the device according to the invention are like-wise preferred for the process.

The invention furthermore relates to the use of the device according to the invention for influencing the passage of energy through a light-transmitting area as a function of temperature. Preference is given to the use for influencing the entry of energy into an interior through a light-transmitting area as a function of temperature.

The passage of energy is influenced in the use according to the invention by the device changing its transmission for light between a switching state having relatively high light transmission (bright state) and a switching state having relatively low light transmission (dark state). The switching operation is temperature-controlled here and takes place in the preferred ranges for the switching operation which are indicated above.

The use according to the invention takes place without application of electrical voltage. The use consequently requires no energy, in particular no electrical energy.

In accordance with the invention, the device has two or more polarisation layers, one of which is arranged on one side of the switching layer and the other is arranged on the opposite side of the switching layer. The switching layer and the two polarisation layers here are preferably arranged parallel to one another. The polarisation layers have the values for the parameters P and T1 which are indicated above as in accordance with the invention and preferably have the values for the parameters P and T1 which are indicated above as preferred.

The polarisation layers can be linear polarisers or circular polarisers. Precisely two polarisation layers are preferably present in the device. In this case, it is furthermore preferred for the polarisation layers either both to be linear polarisers or both to be circular polarisers.

Particularly preferably, the two polarisation layers are each, identically or differently, absorptive or reflective linear polarisers. Very particularly preferably, the two polarisation layers are absorptive linear polarisers.

A reflective polariser in the sense of the present application reflects light having one polarisation direction or one type of circular-polarised light, while it is transparent to light having the other polarisation direction or the other type of circular-polarised light. Correspondingly, an absorptive polariser absorbs light having one polarisation direction or one type of circular-polarised light, while it is transparent to light having the other polarisation direction or the other type of circular-polarised light.

If two linear polarisers are present in the device, it is preferred in accordance with the invention for the planes of polarisation of the two polarisers to be rotated by an angle of 70° to 110°, particularly preferably 80° to 100° and very particularly preferably 85° to 95° with respect to one another.

According to a preferred embodiment of the invention, one or both of the polarisation layers are formed from a layer comprising a liquid-crystalline medium and one or more dichroic dyes. The liquid-crystalline medium here preferably comprises two or more, particularly preferably 5 or more, very particularly preferably 7 or more, different liquid-crystalline compounds.

For the purposes of the present application, the term liquid-crystalline compound is taken to mean a compound which exhibits liquid-crystalline properties under certain conditions, and in particular a compound which forms a nematic liquid-crystalline phase under certain conditions.

The liquid-crystalline compounds can be selected as desired from liquid-crystalline compounds known to the person skilled in the art. Preference is given to liquid-crystalline compounds of limited size and molecular weight (small molecules). It is particularly preferred for the liquid-crystalline compound to have a molecular weight of not greater than 1000 Da, very particularly preferably not greater than 800 Da and most preferably not greater than 600 Da.

Suitable liquid-crystalline media for use in the polarisation layers are media which have high temperature stability and are light-stable. They preferably have a clearing point of greater than 50° C., particularly preferably greater than 70° C. and very particularly preferably greater than 90° C.

According to a preferred embodiment of the invention, the liquid-crystalline medium comprises one or more polymeric compounds. According to a preferred embodiment, the polymer is in the form of a continuous phase in a polymer network (polymer network systems). The polymer network is preferably permeated by the liquid-crystalline medium and/or dissolved in the liquid-crystalline medium, so that an optically uniform appearance is present. It is preferably formed by polymerisation of mono- or diacrylate monomers which are added to the liquid-crystalline medium. The liquid-crystalline medium is preferably present in the mixture with the polymeric compound in a proportion of greater than 60%, particularly preferably 70 to 95%. Systems of this type are described in detail, for example, in EP 452460, EP 313053 and EP 359146.

Dichroic dyes which can be used are the compounds disclosed in Liquid Crystals, Applications and Uses, 1992, World Scientific Publishing, Editor B. Bahadur, on pages 73-81. Preference is given to anthraquinone, naphthoquinone, benzoquinone, perylene and tetrazine dyes and compounds containing one or more azo groups or one or more Schiff bases.

The dichroic dyes are preferably selected from the following compounds:

ylcellulose, polycarbonate, polyacrylate, polysulfone, polyethylene terephthalate, polyethylene naphthalate, polyether sulfone, polyphenylene sulfide, polyphenylene oxide, polyamide, polyimide, polyvinyl chloride or a copolymer of the above-mentioned polymers. The polymer is preferably in the form of a transparent film.

The alignment of the polymer is preferably achieved by stretching the polymer film. Methods for this purpose are known to the person skilled in the art and are described, for example, in U.S. Pat. No. 7,820,080.

The aligned polymer preferably comprises one or more light-absorbent compounds. Compounds which are suitable for this purpose are, in particular, organic dyes and iodine.

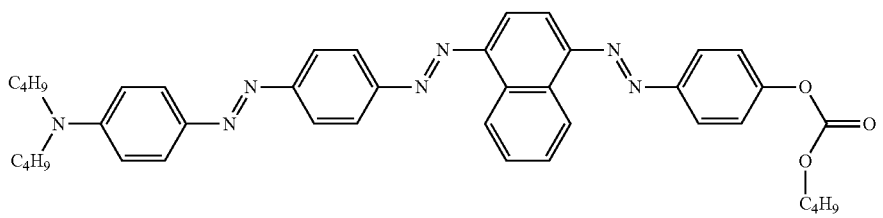

1

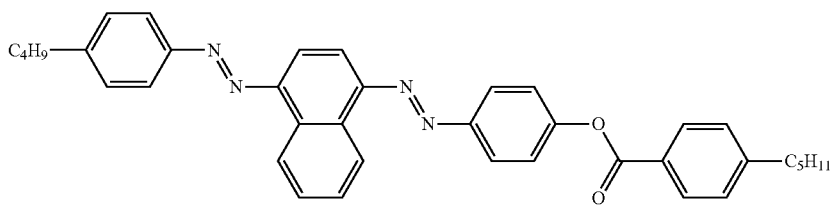

2

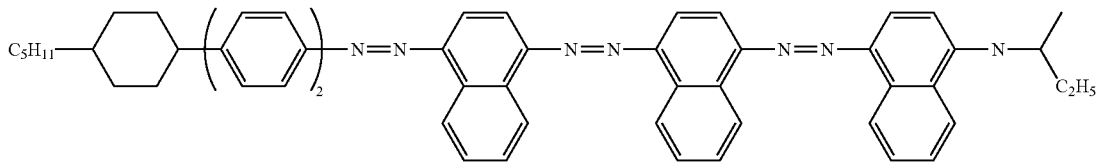

3

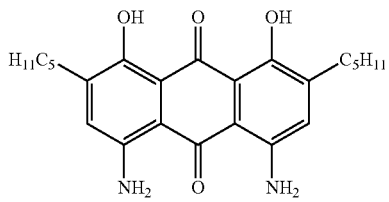

4

The dyes are preferably present in the mixture in a concentration of 0.01% by weight to 5% by weight, particularly preferably 0.05% by weight to 1% by weight. They are preferably dissolved in the liquid-crystalline medium.

It is furthermore preferred to use two or more dyes together. It is particularly preferred to use precisely two or three dyes. The dyes used are preferably selected so that their absorption spectra complement one another to form a neutral, i.e. non-coloured, impression for the human eye. For certain embodiments, however, it may also be preferred to use one or more dyes which together produce a coloured impression.

According to an alternative preferred embodiment, one or both of the polarisation layers are formed from a layer comprising an aligned polymer. This polymer can be, for example, polyethylene (PE), polyvinyl alcohol (PVA), polymethyl vinyl ether, polyhydroxyethyl acrylate, cellulose, hydroxyethylcellulose, hydroxypropylcellulose, meth- Examples of the use of organic dyes are disclosed in Thulstrup et al., Spectrochimica Acta 1988, 8, 767-782. Examples of the use of iodine are indicated in U.S. Pat. No. 7,820,080.

One or both of the polarisation layers are particularly preferably formed from a layer comprising a transparent, stretched polymer film with incorporated iodine. The polymer film here is preferably a polyvinyl alcohol film.

The switching layer of the device according to the invention preferably comprises a liquid-crystalline medium which comprises at least one liquid-crystalline compound. The switching layer preferably comprises a mixture of various liquid-crystalline compounds. The switching layer particularly preferably comprises at least 5 and at most 15 different liquid-crystalline compounds.

The liquid-crystalline compounds can be selected as desired from liquid-crystalline compounds known to the person skilled in the art. Preference is given to liquid-crystalline compounds of limited size and molecular weight (small molecules). It is particularly preferred for the liquid-crystalline compound to have a molecular weight of not greater than 1000 Da, very particularly preferably not greater than 800 Da and most preferably not greater than 600 Da.

The mixture of the liquid-crystalline compounds (or in the case where only one liquid-crystalline compound is used, the single liquid-crystalline compound) preferably has a clearing point between −20° C. and 200° C., particularly preferably a clearing point between 10° C. and 180° C.

For use as liquid-crystalline media, particular preference is given to the mixtures of liquid-crystalline compounds disclosed in WO 2011/134582, WO 2011/144299, WO 2011/154077 and those disclosed in the as yet unpublished applications EP 10008779.0 and EP 10013797.5.

The liquid-crystalline medium of the switching layer preferably changes from a nematic state to an isotropic state during the switching operation with increasing temperature. The nematic state here is preferably associated with the state of the device having relatively high light transmission, and the isotropic state is associated with the state of the device having relatively low light transmission.

The liquid-crystalline medium may furthermore comprise one or more polymeric compounds. The medium here is particularly preferably one of the liquid-crystalline media comprising polymeric compounds which are described in the as yet unpublished application EP 11008518.0. For still further information on polymer network systems, reference is made to the disclosure content of the applications EP 452460, EP 313053 and EP 359146.

According to a preferred embodiment of the invention, the switching layer comprises a twisted nematic layer. The twist of the preferential direction of the liquid-crystalline compounds is preferably effected here by two or more alignment layers, at least one of which is located on one side of the switching layer and at least one of which is located on the opposite side of the switching layer.

The device according to the invention preferably comprises at least one substrate layer, which is preferably formed from glass, a polymer or ITO. The substrate layer is preferably rigid.

Furthermore, it may have one or more further functional layers in addition to the polarisation layers and the switching layer. Individual functional-layer types indicated below or all types may be present in the device. The layers are preferably passive, i.e. cannot be changed in their action.

The further functional layers are preferably selected from protective layers against weathering influences, damage by the action of hard objects, ageing and UV light. Protective layers of this type, their effects and methods for the application and use thereof are known to the person skilled in the art.

Further preferred layers are selected from layers which block light having a certain wavelength or reduce its transmission, for example NIR light or light having a certain wavelength (colour) in the visible region. Preference is given to NIR transmission-preventing layers, for example comprising cholesteric liquid-crystalline material, ceramic material, metal or metal oxide.

Further preferred functional layers are selected from alignment layers, known to the person skilled in the art, for liquid-crystalline compounds. At least two alignment layers are preferably present, where at least one alignment layer is arranged on one side of the switching layer and at least one alignment layer is arranged on the opposite side of the switching layer. The alignment layers may also serve as substrate layers, meaning that no substrate layers are necessary in the device. In a preferred embodiment of the invention, the alignment layers consist of rubbed polyimide or rubbed polyacrylate.

The device preferably has the structure depicted in FIG. 1. (1) here denotes the device, (2) denotes the switching layer, and (3a) and (3b) denote the polarisation layers. FIG. 1 describes the basic arrangement of the layers and is not intended, for example, to exclude further functional layers, for example one or more alignment layers and/or one or more protective layers which block external influences or light of a certain wavelength, from being located between the layers shown or outside the layer arrangement.

FIG. 2 depicts a further preferred structure of the layer arrangement, in which the arrangement comprising the switching layer and the two polarisation layers is located on a substrate layer (4).

The following working examples describe preferred embodiments of the device according to the invention. The person skilled in the art will be able to recognise the function principle of the invention with reference to the examples and apply it to further embodiments which are not described explicitly. The examples do not imply any restriction of the invention to that directly described.

WORKING EXAMPLES

1. Production of the Polarisation Layers

The following components are used for the production of the polarisation layers:

LC Mixture A:

| LC compound | % |
| --- | --- |
| CP-3-N | 20 |
| PZG-5-N | 10 |
| PZP-1O-1 | 11 |
| PZP-1O-5 | 16 |
| PGU-3-F | 9 |
| CPZG-3-N | 5 |
| CPZG-4-N | 5 |
| CPZG-5-N | 5 |
| CCZPC-3-3 | 3 |
| CCZPC-3-4 | 3 |
| CGPC-3-3 | 5 |
| CGPC-5-3 | 4 |
| CGPC-5-5 | 4 |

LC Mixture B:

| LC compound | % |
| --- | --- |
| PZG-3-N | 2 |
| PZG-4-N | 9 |
| PZG-5-N | 9 |
| PZP-1-5 | 10 |
| PZP-1O-1 | 17 |
| PZP-1O-5 | 16 |
| CP-3-N | 12 |
| PP-2-N | 10 |

-continued

| LC compound | % |
|---|---|
| PGU-3-F | 9 |
| CPZG-3-N | 3 |
| CPZG-4-N | 3 |

Dye Mixture:

| Dye | Parts |
|---|---|
| 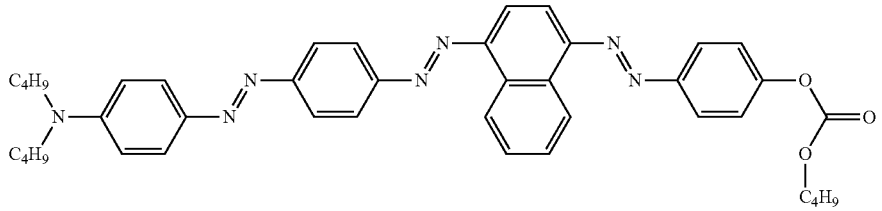 | 37 |
| 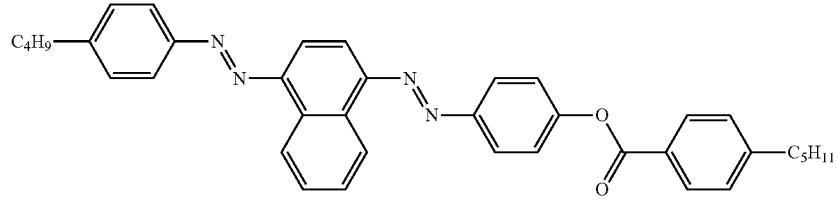 | 76 |
| 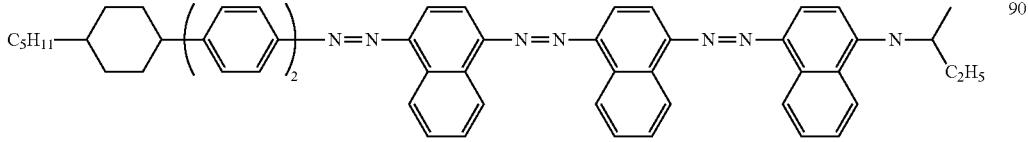 | 90 |

The following polarisation layers EP-1 to EP-4 are produced from the components indicated:

| | LC mixture | Proportion of dye mixture |
|---|---|---|
| EP-1 | A | 0.1% |
| EP-2 | A | 0.3% |
| EP-3 | A | 0.5% |
| EP-4 | B | 0.3% |

Furthermore, the following polarisation layers VP-1 to VP-3 are produced or purchased commercially (VP-3) for comparison:

| | LC mixture | Proportion of dye mixture |
|---|---|---|
| VP-1 | A | 1% |
| VP-2 | B | 1% |
| VP-3 | absorptive polariser ITOS XP38 | |

The following values T1, T2 and P are obtained for the polarisation layers (determined at 550 nm):
T1: transmission of the polariser layer in the transmission direction
T2: transmission of the polariser layer in the blocking direction
P: degree of polarisation, can be determined from the equation:

$$P=(T1-T2)/(T1+T2)$$

| | T1/% | T2/% | P/% |
|---|---|---|---|
| EP-1 | 94.1 | 60.9 | 21.5 |
| EP-2 | 86.1 | 22.2 | 58.9 |
| EP-3 | 79.7 | 9.1 | 79.5 |
| EP-4 | 79.1 | 26.3 | 50.2 |
| VP-1 | 63.3 | 0.7 | 97.8 |
| VP-2 | 48.0 | 1.2 | 95.0 |
| VP-3 | 71.5 | 0.1 | 98.6 |

After production and measurement of a relatively large number of polarisation layers produced in different ways, an empirical correlation can be observed between the production parameters and the value pairs T1 and P obtained. In the present example, it can be seen that an increase in P and a reduction in T1 occur with an increase in the dye concentration for the same LC mixture. On changing from mixture A to mixture B (cf. EP-3 and EP-4), a significantly reduced value for P can be achieved with constant T1.

Corresponding polarisation layers can be produced in the manner described for any desired value pairs T1 and P through the use of different concentrations of dye mixture and the use of different LC mixtures.

2. Production of the Devices

Devices E-1 to E-4 and comparative devices V-1 to V-3 are produced by applying the polarisation layers described above in each case to the top side and underside of a nematic twisted cell.

The nematic twisted cell contains alignment layers and a layer of a liquid-crystalline medium and is produced by processes which are generally known to the person skilled in the art.

For the devices obtained, the transmission in the state having relatively high light transmission (bright transmission) and the transmission in the state having relatively low light transmission (dark transmission) are determined in each case. The switching range arises from the difference between the two values. All values were again determined at 550 nm.

|  | Bright transmission/% | Dark transmission/% | Switching range/% |
|---|---|---|---|
| E-1 | 62.8% | 57.3% | 5.5% |
| E-2 | 39.5% | 19.2% | 20.3% |
| E-3 | 32.2% | 7.3% | 24.9% |
| E-4 | 34.8% | 20.8% | 14% |
| V-1 | 20.0% | 0.5% | 19.5% |
| V-2 | 11.5% | 0.6% | 10.3% |
| V-3 | 37.2% | ~0% | 37.2% |

It can be seen from the table that the devices according to the invention all have an acceptable dark transmission (about 7% or more). The values for the bright transmission and the switching range can be set independently of one another (cf., for example, E-3 and E-4). This is highly desired for the intended use, since the advantages of a large switching range and the advantages of a high bright transmission can thus be weighed up against one another and the desired combination of the two values can be set.

In the range of the parameters P (20-85%) and T1 (70-100%) which is selected for devices E-1 to E-4, advantageous values are obtained both for the bright transmission and also for the switching range (see table above).

The comparative devices in accordance with the prior art (V-1 to V-3), which exhibit values for the parameters P and T1 outside these ranges, have an unfavourably low dark transmission for use of the devices in windows.

FIGS. 3 to 8 show the transmission spectra obtained for devices E-1 to E-4 and V-1 and V-2 in the range from 400 to 900 nm, in each case in the bright state (curve 1) and in the dark state (curve 2).

Figure 1:
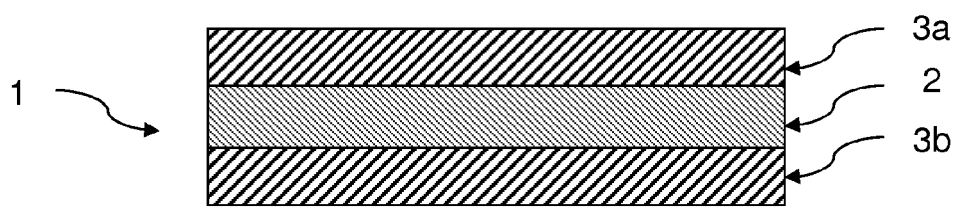
FIG. 1 denotes a device of this invention
FIG. 2 denotes a structure of the layer arrangement
Figure 2:
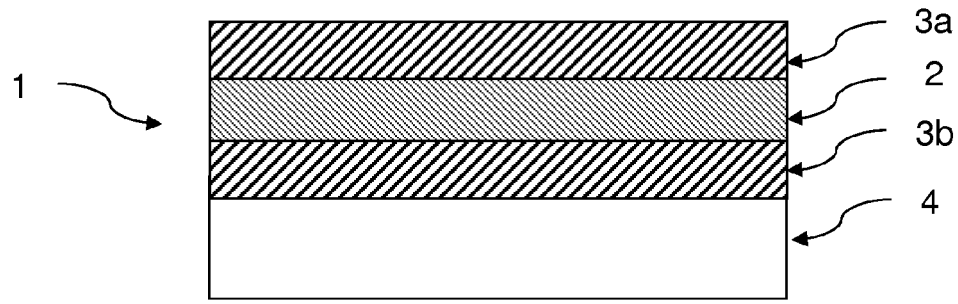
Figure 3:
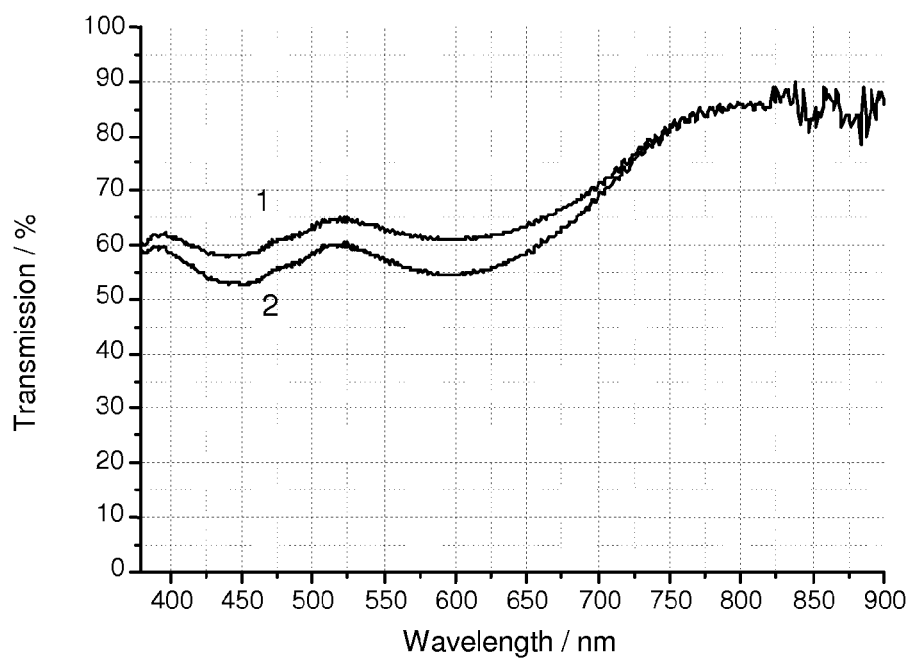
FIG. 3 shows the transmission spectrum for device E-1 according to the invention.
Figure 4:
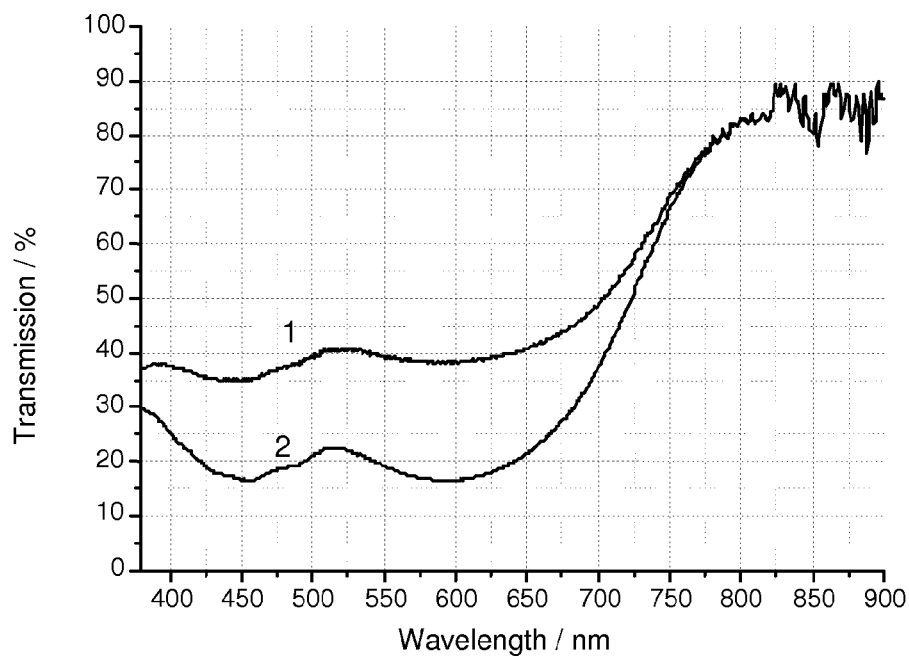
FIG. 4 shows the transmission spectrum for device E-2 according to the invention.
Figure 5:
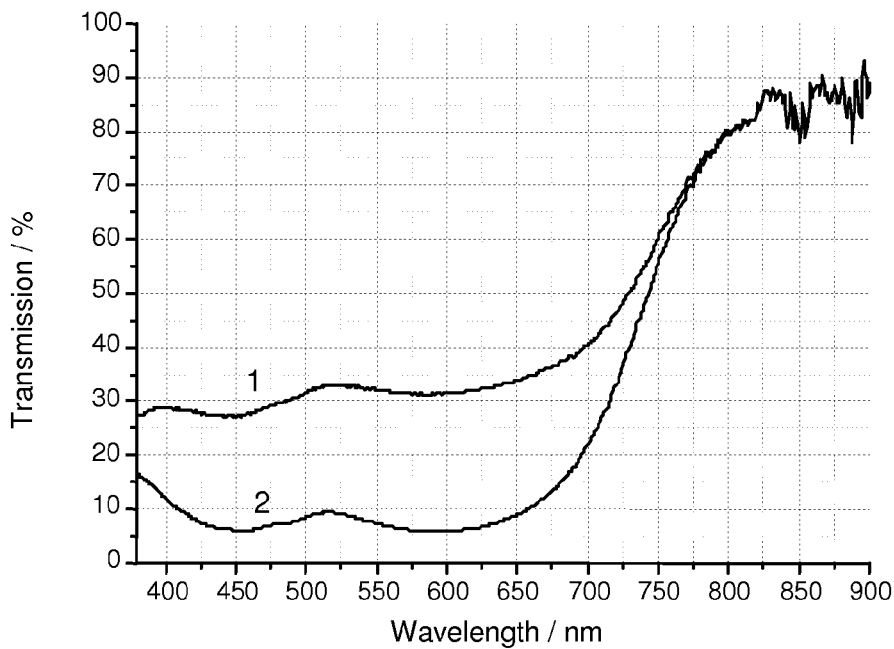
FIG. 5 shows the transmission spectrum for device E-3 according to the invention.
Figure 6:
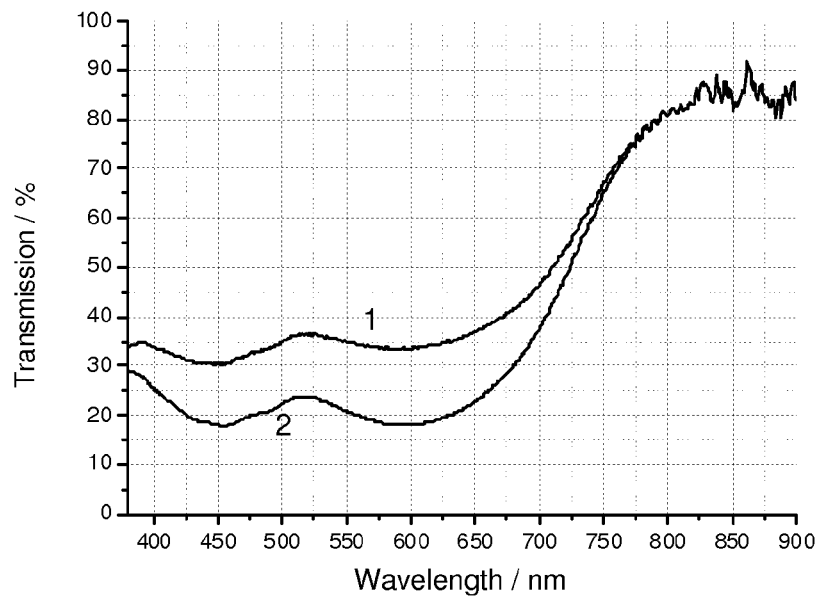
FIG. 6 shows the transmission spectrum for device E-4 according to the invention.
Figure 7:
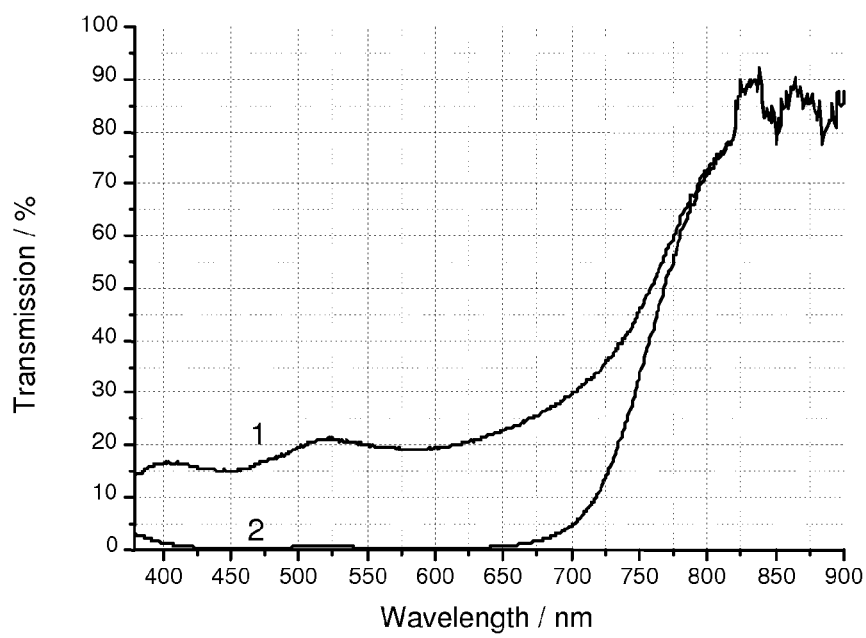
FIG. 7 shows the transmission spectrum for comparative device V-1.
Figure 8:
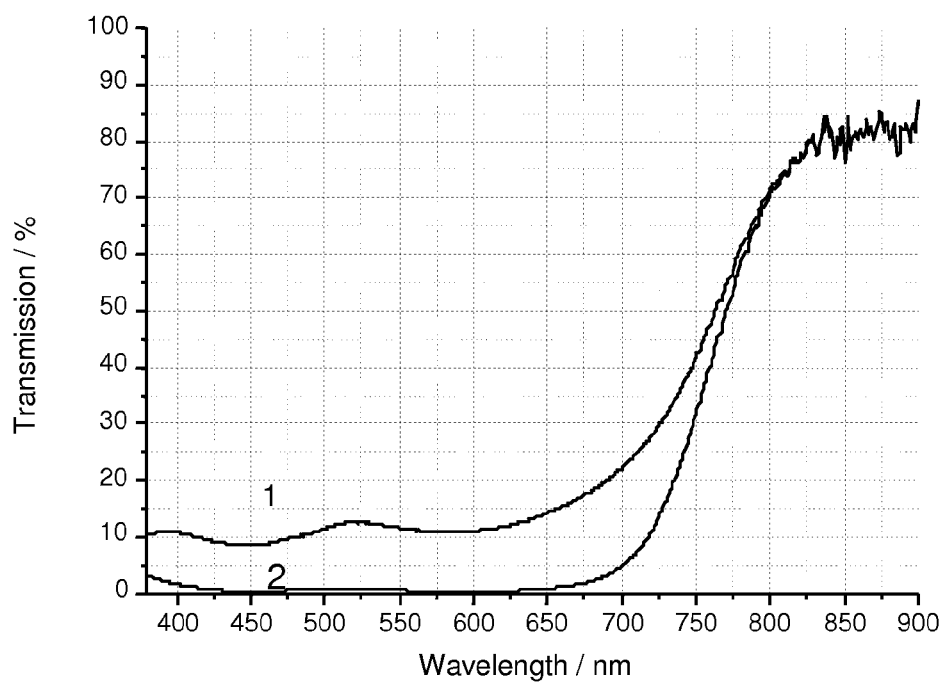
FIG. 8 shows the transmission spectrum for comparative device V-2.

3. Alternative Production Processes for the Polarisation Layers

In accordance with a further example, the polarisation layers are produced by admixing polymerisable monomers in addition to the LC mixture and the dye mixture. These are, for example, acrylates, such as monoacrylates, diacrylates and multifunctional acrylates, or epoxides or vinyl ethers. It is possible to use mixtures of monomers, for example mixtures of mono- and diacrylates or mixtures of epoxides and vinyl ethers. The monomers may contain mesogenic groups. The mixture comprising the liquid-crystalline medium, the dye and the monomers is subsequently polymerised in the form of a layer. The polymerisation can be carried out, for example, by induction with UV light.

The process described above enables particularly robust and temperature-stable polarisation layers to be produced for devices in accordance with the present invention.

According to a further example, the polarisation layers are produced by stretching a polymer film comprising polyvinyl alcohol (PVA). Iodine is subsequently incorporated into the films.

Polarisation layers having a different degree of stretching of the PVA film, a different iodine concentration and different thickness are produced. The values for the transmission in the transmission direction (T1) and the degree of polarisation are determined for the polarisation layers obtained. After production and measurement of a relatively large number of polarisation layers produced in different ways, an empirical correlation can be observed between the production parameters and the value pairs T1 and P obtained. In this way, corresponding polarisation layers can be produced for any desired value pairs T1 and P.

The invention claimed is:

1. Device for regulating the passage of energy through a light-transmitting area, where the device comprises the following layers:
   a first polarisation layer,
   a second polarisation layer, and
   a switching layer, arranged between the two polarisation layers, which changes the polarisation properties of polarised light as a function of temperature,
   where the two polarisation layers have, identically or differently, a degree of polarisation P in the range 20-85% and a transmission in the transmission direction T1 in the range 70-100%, determined at a wavelength of 550 nm, and
   where one or both of the polarisation layers are formed from a layer comprising a liquid-crystalline medium and one or more dichroic dyes, with the one or more dichroic dyes present in an amount of 0.01 to 5% by weight of said liquid crystalline medium.

2. Device according to claim 1, wherein the passage of energy takes place into an interior which is selected from interiors of a building, a vehicle or a transport container.

3. Device according to claim 1, which switches from a switching state having relatively high light transmission to a switching state having relatively low light transmission as a function of temperature.

4. Device according to claim 3 wherein the switching from the switching state having relatively high light transmission to the switching state having relatively low light transmission takes place gradually in a temperature range from 0° C. to 80° C.

5. Device according to claim 1, wherein the two polarisation layers have, identically or differently, a degree of polarisation P in the range 30%-85% and a transmission in the transmission direction T1 in the range 75%-100%, determined at a wavelength of 550 nm.

6. Device according to claim 1, wherein the two polarisation layers are linear polarisers whose planes of polarisation are rotated by an angle of 70° to 110° with respect to one another.

7. Device according to claim 1, wherein both of the polarisation layers are formed from a layer comprising a liquid-crystalline medium and one or more dichroic dyes.

8. Device according to claim 1, wherein one or both of the polarisation layers are formed from a layer comprising an aligned polymer.

9. Device according to claim 1, wherein the switching layer comprises a liquid-crystalline medium which changes from a nematic state to an isotropic state during the switching operation with increasing temperature.

10. Device according to claim 1, wherein the switching layer in the optically anisotropic state rotates the plane of polarisation of linear-polarised light by an angle of 10° or more, and in the isotropic state does not rotate the plane of polarisation of linear-polarised light or only does so to a negligible extent.

11. Device according to claim 1, which additionally comprises a substrate layer, which is formed from glass, a polymer or ITO.

12. A method which comprises operating a device according to claim 1 for influencing the passage of energy through a light-transmitting area as a function of temperature.

13. A method according to claim 12, wherein the device switches from a state having relatively high light transmission to a state having relatively low light transmission without application of electrical voltage.

\* \* \* \* \*